United States Patent [19]
Shaler et al.

[11] 3,797,024
[45] Mar. 12, 1974

[54] STYLUS MOUNTING FOR BELT-TYPE FACSIMILE RECORDER

[75] Inventors: David Shaler, Madison; John H. Long, Oakland, both of N.J.

[73] Assignee: Muirhead, Inc., Mountainside, N.J.

[22] Filed: Feb. 5, 1973

[21] Appl. No.: 329,647

[52] U.S. Cl. ...... 346/139 A, 346/139 R, 346/139 C
[51] Int. Cl. ...................... G01d 15/16, G01d 15/18
[58] Field of Search ......... 346/139 A, 139 C, 139 R

[56] References Cited
UNITED STATES PATENTS

| | | | |
|---|---|---|---|
| 3,683,412 | 8/1972 | Priessnetz | 346/139 A |
| 3,108,845 | 10/1963 | Zabriskie | 346/139 A |
| 2,879,129 | 3/1959 | Alden | 346/139 C |

*Primary Examiner*—Richard B. Wilkinson
*Assistant Examiner*—Vit W. Miska
*Attorney, Agent, or Firm*—Edward T. Connors

[57] ABSTRACT

A stylus mounting held in position on a toothed belt by pin members extending into the spaces between adjacent teeth of the belt. In one construction a pair of pin members is used while in the other construction a single pin member is used.

14 Claims, 5 Drawing Figures

PATENTED MAR 12 1974 3,797,024

3,797,024

STYLUS MOUNTING FOR BELT-TYPE FACSIMILE RECORDER

BACKGROUND OF THE INVENTION

This invention relates to electrostatic facsimile recorders of the type including a plurality of styli mounted on a belt, and more particularly to a stylus mounting to attach a stylus to the belt.

Faacsimile recording of copy is commonly effected on a continuous sheet of electrostatic recording medium such as treated paper as it is advanced past a scanning line position. A plurality of electrical styli are spaced along an endless toothed belt traveling around pulleys so that the styli successively pass across the scanning line position to mark the recording sheet in accordance with received facsimile signals.

It is usual to mount a plurality of styli at equally spaced intervals on the belt rather than a single stylus in order that one stylus is in contact with the recording paper at almost all times during the rotation of the belt. The result of having a plurality of styli is that the copy is being almost continuously recorded.

Each of the styli is carried by a stylus holder or mounting which is generally rigidly secured to the belt. A common method securing the stylus mounting to the belt is shown in U.S. Pat. No. 3,683,412 issued to Edmund F. Priessnetz in which the belt is perforated, the stylus mounting being carried on the back of the belt, while an apertured cross bar is positioned between a pair of teeth on the front of the belt. The mounting is held in position by engagement of screws extending through the cross bar and the perforated belt into the stylus mounting. In other cases the belt has been perforated and the stylus mounting held in place by rivets extending through the belt. Such a construction is shown in U.S. Pat. No. 2,879,129 issued to M. Alden. It is quite apparent that in such constructions the belt is weakened somewhat by the perforations extending therethrough. It is also quite apparent that it is very important that the mass of the stylus and its mounting be kept at a minimum so as to minimize the strain on the belt as it is rotated.

SUMMARY OF THE INVENTION

The present invention aims to overcome the foregoing disadvantages by providing a stylus mounting held in position without the use of perforations in the belt.

Another object of the invention is to provide a stylus mounting which does not require adjustments in its longitudinal position along the belt.

A further object of the invention is to provide, in one form of the invention, a stylus mounting which may be used to secure the ends of a length of toothed belt so that in effect an endless belt may be prepared therefrom.

In accordance with the invention this is accomplished by providing a stylus mounting which clamps the belt between a backing member and a pin member extending at least partially between the spaces between adjacent teeth of the belt. In another form of the invention a pair of pin members are used perferably engaging at the sides of a single tooth of the belt. The later form of the invention is advantageous as it permits the engagement of the ends of a length of belt so as to form in effect an endless belt.

Other objects and advantages of the invention will be apparent from the following description and from the accompanying drawing which shows, by way of examples, embodiments of the invention.

DESCRIPTION OF THE PREFERRED EMBODIMENTS

Figure 1:
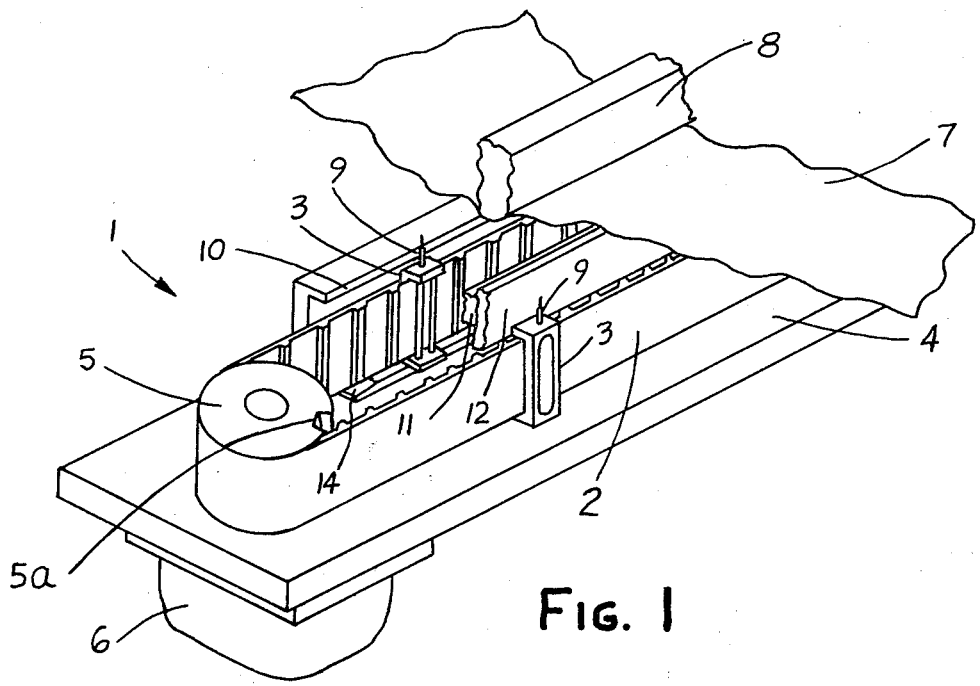
FIG. 1 is a perspective view of a portion of a facsimile recorder illustrating a plurality of styli mounted on a toothed belt in accordance with the invention.

Referring to the drawing there is shown in FIG. 1 a portion of a facsimile recorder 1 utilizing a toothed belt 2 and incorporating a plurality of stylus mountings 3 in accordance with the invention. The facsimile recorder 1 includes a supporting base 4 on which is carried a pair of pulleys 5 of which only one is shown. The pulleys 5 are adapted to be rotated by a motor 6. A sheet of recording medium or paper 7 is moved past a platen 8 by means well known in the art. The platen 8 backs a line of scan past which move the styli 9 carried in the stylus mountings 3. Also carried by the supporting base 4 is a guiding surface 10 adapted to bear against the rear sides of the styli 9 as they pass the line of scan. Another guiding member 11 is carried by a support 12 within the area traversed by the toothed belt 2. A stylus paper edge avoidance ramp member 14 is provided which may extend across the width of the paper sheet 7 to form a commutator.

Figure 2:
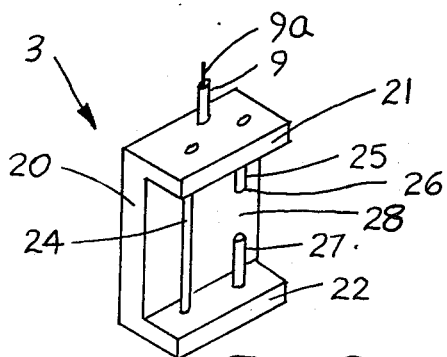
FIG. 2 is a perspective view of one of stylus mountings of FIG. 1 shown at an enlarged scale. One of the pin members is shown of different form than the other pin member as will be described later.
Figure 3:
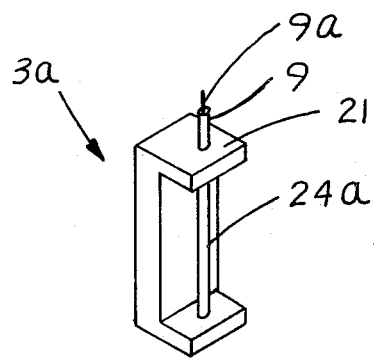
FIG. 3 is a perspective view corresponding to FIG. 2 of a modified form of stylus mounting using a single pin member.
Figure 4:
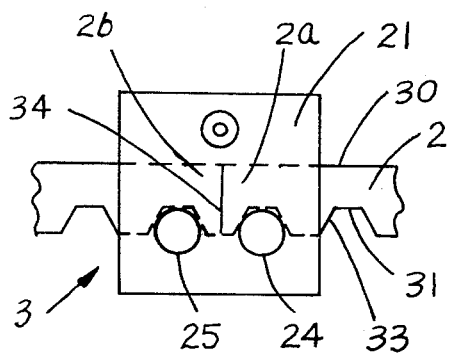
FIG. 4 is a sectional view at an enlarged scale taken through the stylus mounting of FIG. 2 with a portion of the toothed belt shown in place.
Figure 5:
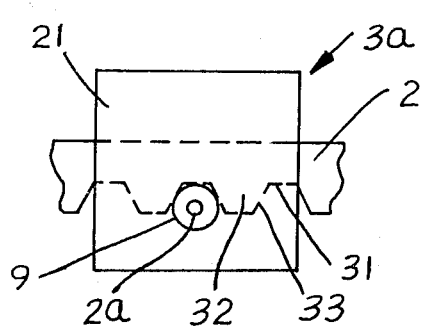
FIG. 5 is a view corresponding to FIG. 4 but illustrating the stylus 3a shown in FIG. 3.

The stylus mounting 3 may be as shown in FIGS. 2 and 4 or the stylus mounting may be modified as shown in FIGS. 3 and 5. The stylus mounting 3 shown in FIGS. 2 and 4 includes a base member 20 adapted to make contact with the back of the belt 2. A pair of side portions or flange members 21 and 22 overlie the edge of the belt 2. The side member 21 and 22 are apertured to receive pin members of either form indicated at 24 and 25. The one-piece pin member 24 extends between the side portions 21 and 22, while the two-piece pin member 25 may be made so that its portions 26 and 27 are spaced as indicated at 28. The stylus 9 may be positioned in an aperture in the side portion 21 and may have a tip of reduced cross sectional area as indicated at 9a. Alternatively, the stylus 9 may be of the types shown in the stylus assemblies described in our copending patent application Ser. No. 329,648 titled Stylus Assemblies filed on even date herewith.

The toothed belt 2 may be any suitable construction carrying a plurality of teeth. Preferably the belt 2 is molded from a polyurethane elastomer reenforced with a polyester cord load carrying member as is known in the art. The polyester cord gives high strength and high modulus to the finished gear belt, and thus is made with inherent accuracy. Such belts are generally made with their root line substantially on the pitch line of the belt. The belt 2 is shown in vertical section with stylus mountings 3 and 3a respectively in position in FIGS. 4 and 5. The belt 2 includes a back surface 30, a root line 31 and teeth 32 each having a tooth profile 33. As shown in FIG. 4 the belt 2 may be constructed of a section 2a and a section 2b, the abutments of the ends of the belt being indicated by the line 34, the ends being held together by the stylus mounting 3.

The pin members 24 and 25 as shown are preferably of circular cross section, the diameter of each of the pin members 24 and 25 being such that at least portions of the sides thereof are in simultaneous contact with at least a portion of the profiles 33 of adjacent teeth 32 and at least a portion of the pin members is in contact with the root line 31 between the teeth. Alternatively, the pin members 24 and 25 might be made with other cross sectional shapes, for example, with slightly flattened surfaces in contact with the profiles of the teeth and with the root line. The pin members 24 and 25 are preferably held in the apertures in the side portions 21 and 22 by frictional engagement therewith, although other means well known in the art may be used to secure the pin members in position.

Preferably the position of the apertures with respect to the dimension of the belt is arranged so that a slight compression is applied between the surfaces of the pin members and the profiles of the teeth and the root line, this pressure being counteracted by the pressure of the base member 20. However, the compression by the pin members 24 and 25 should not be enough to unduly distort the belt. The proper compression depends to a large extent upon the material of the belt used and may be readily determined by experiment. In the case of the preferred polyurethane belt it was found that a compression of about 0.010 inch in the thickness of the belt between its root line and back provided satisfactory results. The pulleys 5 have spaces between teeth cut away or relieved slightly to provide space 5a for the pin members 24 and 25. In using the construction of the pin member 25 it is unnecessary to cut away the center portion of the pulley surface making contact with the space 28 between the ends 26 and 27 of the pin member 25.

The mounting 3a illustrated in FIG. 3 differs somewhat from the construction shown in FIG. 2 in that only a single pin member 24a is used. In this construction the stylus 9 may be engaged in the end of the pin member 24a which may be made of tubular construction. Alternatively, as stated above, the stylus 9 may have any other suitable construction.

In the construction of FIG. 2 the stylus 9 is mounted behind the base of the belt 2 while in the construction of FIG. 3 the stylus is positioned inwardly of the root line 31 of the belt 2.

The stylus mountings 3 or 3a in accordance with the invention are advantageous in that they may be fabricated of lightweight material and require small mass. In using the two pin member construction the belt 2 may be made up of strips of belting rather than requiring the use of an endless belt which might require a special mold to fit the particular pulley, spacing, and configuration desired.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

We claim:

1. A stylus mounting for a facsimile recorder utilizing a toothed belt, the stylus mounting comprising
   a base member adapted to make contact with the back of the belt,
   side portions for said base member overlying the edges of the belt,
   a pin member secured at least at one end in one of said side portions,
   said pin member shaped to have portions thereof in simultaneous contact with at least a portion of the profiles of adjacent teeth of said belt and at least a portion of said pin member is in contact with the root line between said teeth.

2. A stylus mounting according to claim 1 in which said base member and said side portions are made integral.

3. A stylus mounting according to claim 1 in which said pin member is secured at each end in said side portions.

4. A stylus mounting according to claim 3 in which a second pin member is provided.

5. A stylus mounting according to claim 4 in which said second pin member is shaped to have portions thereof in simultaneous contact with at least a portion of the profiles of adjacent teeth and at least a portion of said pin member is in contact with the root line between the teeth with which it is in contact.

6. A stylus mounting according to claim 5 in which said pin members are separated by a single tooth.

7. A stylus mounting according to claim 3 in which said pin member is secured in openings in said side portions by frictional contact therewith.

8. A stylus mounting according to claim 3 in which said pin member is cylindrical in cross-sectional shape.

9. A stylus mounting according to claim 1 in which a stylus assembly is positioned in said backing member.

10. A stylus mounting according to claim 3 in which a stylus assembly is positioned in said pin member.

11. A stylus mounting according to claim 9 in which a stylus is positioned in said stylus assembly outwardly of the back of the belt with which it is to be used.

12. A stylus mounting according to claim 10 in which a stylus is positioned in said stylus assembly inwardly of the root line of the belt with which it is to be used.

13. A stylus mounting according to claim 1 in which said stylus assembly is fixedly positioned by said pin member in relationship to said root line and said profiles of adjacent teeth of said belt so that the inherent accuracy of the belt parameters are imparted to the stylus position.

14. A stylus mounting according to claim 4 in which said toothed belt is made with at least one strip of belting, the ends of said belt being held together by said stylus mounting so that in effect an endless belt is provided.

* * * * *